United States Patent [19]

Katinger

[11] Patent Number: 4,828,719
[45] Date of Patent: May 9, 1989

[54] METHOD AND DEVICE FOR SEPARATING LIQUID AND/OR GAS FROM LIQUID OR GASEOUS MIXTURE

[75] Inventor: Hermann W. Katinger, Vienna, Austria

[73] Assignee: Chemap AG, Volketswil, Switzerland

[21] Appl. No.: 63,254

[22] Filed: Jun. 17, 1987

[30] Foreign Application Priority Data

Jun. 17, 1986 [AT] Austria .................. 1648/86

[51] Int. Cl.⁴ ............................................ B01D 33/00
[52] U.S. Cl. .................................. 210/780; 210/785; 55/97
[58] Field of Search ................ 55/15, 96, 97, 277, 55/292, 300; 210/780, 785, 407

[56] References Cited

U.S. PATENT DOCUMENTS

| | | | |
|---|---|---|---|
| 3,002,915 | 10/1961 | Royder | 210/785 |
| 3,478,883 | 11/1969 | De Luca | 55/292 |
| 3,766,059 | 10/1973 | Sasaki | 210/748 |
| 3,870,640 | 3/1975 | Reece et al. | 210/388 |

FOREIGN PATENT DOCUMENTS

| | | | |
|---|---|---|---|
| 535572 | 1/1957 | Canada | 210/407 |
| 602162 | 7/1978 | Switzerland . | |
| 695677 | 11/1979 | U.S.S.R. | 210/785 |

OTHER PUBLICATIONS

"The Vibro-Mixer Principle", Chemap AG, 9 pp. (Switzerland).

Primary Examiner—Bernard Nozick
Attorney, Agent, or Firm—Michael J. Striker

[57] ABSTRACT

In a method and a device for extracting liquid or gas from a liquid or gaseous mixture containing dispersed solid particles, a cylindrical filter disposed in a container receiving a mixture to be filtered is subjected to oscillations in the axial direction of the filter while the mesh of the filter is of the size greater than that of particles to be retained on the filter.

11 Claims, 2 Drawing Sheets

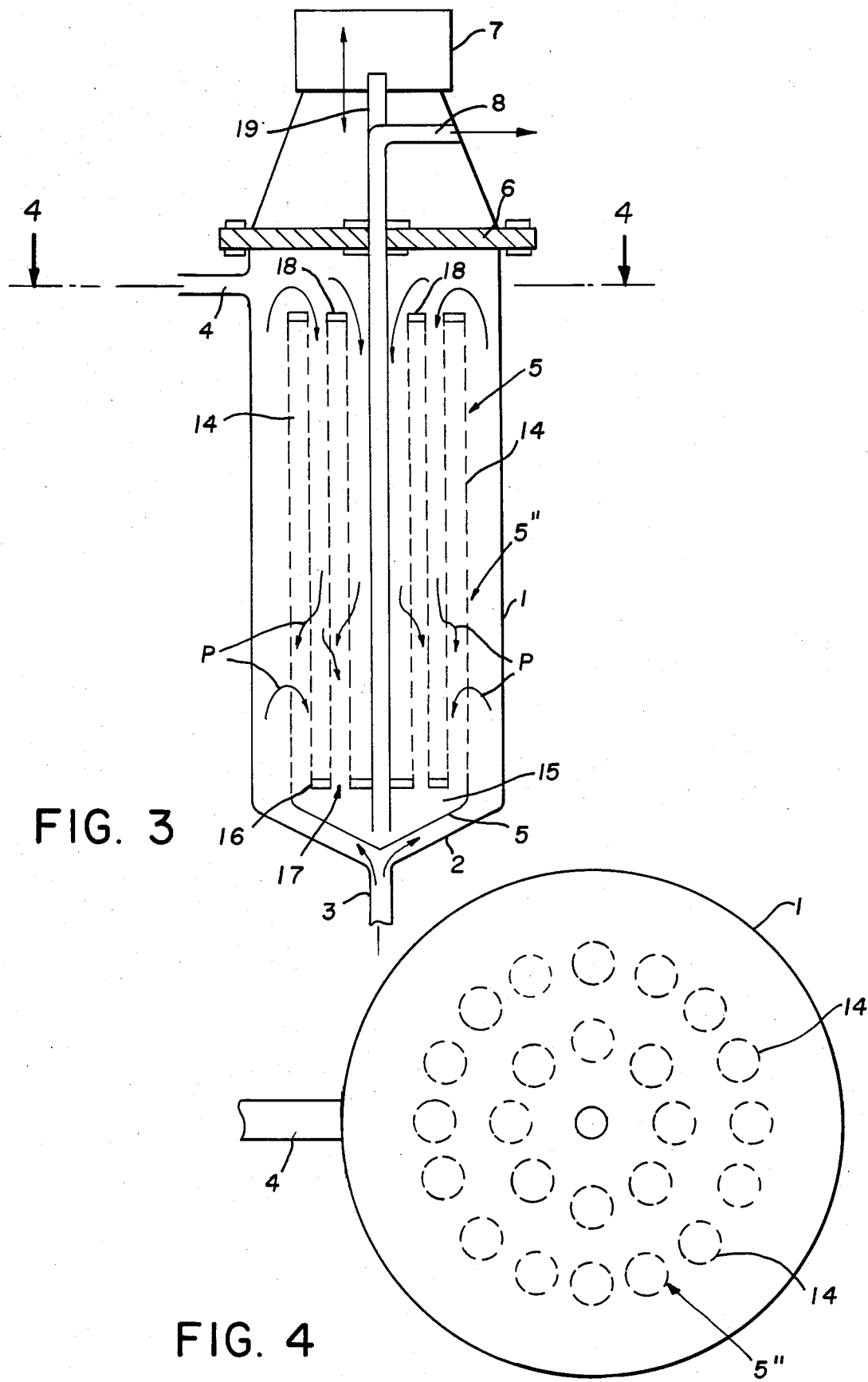

METHOD AND DEVICE FOR SEPARATING LIQUID AND/OR GAS FROM LIQUID OR GASEOUS MIXTURE

BACKGROUND OF THE INVENTION

The present invention relates to a method of extracting liquid and/or gas from a fluidic or gaseous mixture containing dispersed particles, in which process liquid and/or gas is processed through an oscillating screen or filter surface with the retention of particles. The invention also relates to a device for executing the process, which device normally includes a container receiving a mixture, at least one screening or filter body which has at least the mesh of the size to retain particles, and devices for conducting the processed liquid.

A method and a device of the type under discussion have been disclosed, for example in CH-PS No. 602,102. The method and device of the reference are intended for retaining solids suspended in liquids. The mixture is processed through the oscillating screening wire basket through which liquid and desired small particles pass whereas the particles which can not pass through the mesh of the basket are retained whereby the vibrations of the screening element, e.g. wire basket must prevent the building up of filter cakes. With such mode of operation, particles of the size smaller than the mesh openings of the screen are not retained on the screen.

With other conventional filtering methods, only such particles can pass through the screening or filtering surface, the size of which is smaller than the mesh size of the filter. Such methods have the disadvantage which resides in that the particles retained on the screen or filter surface are collected under the building of filter cakes whereby they must be practically pushed through the liquid flow into the mesh of the filter and it is required, in relatively short intervals, to remove filter cakes from the filter surface and to free the mesh of the filter. These problems have been solved by different means, for example by a cross flow filtration in which the mixture is fed parallel to the filter surface whereby the liquid flow must float the deposited solids from the filter surface. It has been also suggested to displace the screen or filter surface in rotation so as to release the upper surface of the filter from the coating or overlay. All these measures have only limited the efficiency and are non-suitable for mixtures utilized particularly for many biotechnological purposes for example biocatalysts, microorganisms, cell cultures, etc., due to high shearing forces.

SUMMARY OF THE INVENTION

It is an object of the present invention to provide an improved method and device for extraction of liquid and gaseous components from mixtures containing dispersed particles.

It is another object of the invention to provide a method and device for extracting liquid and/or gas from solids-containing fluidic mixtures, which would ensure in a simple fashion an effective separation of liquid and/or gas, without clogging of filters, and an easy uniform retention of dispersed particles.

These and other objects of the invention are attained by a method for separating liquid and/or gas from a liquid or gaseous mixture containing dispersed solid particles, comprising the steps of providing a filter body receiving said mixture and filtering the same to retain said particles, subjecting said filter body to oscillations using the filter body having a filter surface which has through opening of a size exceeding a diameter of particles to be retained, and adjusting an amplitude and/or frequency of said oscillations at least to such values to prevent a passage of the particles being retained.

The important and surprising feature of the method according to this invention resides in that the adjustment of the amplitude and frequency of oscillations imparted to the filter body for example by a conventional vibro-mixer comprising a heavy soft iron core connected to a push rod of the filter body and surrounded by a set of electromagnetic coils in an adjustably alternating current circuit ensures that the passage of particles to be retained through the mesh of the screen or filter surface be prevented when these particles are considerably smaller than the mesh openings of the filter surface. Due to the utilization of the filter with the filter surface with the mesh having the size greater than that of the particles to be retained the passage of the liquid or gas to be separated from the mixture is facilitated and the building up of filter cakes on the filter surface is avoided.

The filter surface with through openings of the size exceeding the diameter of the particles being retained by 10 to 50% may be oscillated with the frequency adjusted to a speed of passing of the fluid or gas through said surface and amounted to between 10 and 100 Hertz and to a particle size between 0.5 and 50 times lower and with an amplitude sufficient to prevent passage of said particles through the filter surface.

The filter surface may be substantially cylindrical and at least said surface may be subjected to said oscillations in an axial direction so as to permit liquid and/or gas to flow through said surface from outward inwardly.

The objects of the invention are also attained by a device for separating liquid and/or gas from a liquid or gaseous mixture containing dispersed solid particles, comprising a container receiving said mixture, at least one filter which is loaded with and is nonpermeable to particles of predetermined minimal size; means for discharging liquid or gas passed through said filter, said filter having through openings of the size exceeding a diameter of particles to be retained; and oscillation-generating means connected to said filter for imparting thereto oscillations which are sufficient to prevent passage of the particles to be retained through said openings.

The filter may include a plurality of filter tubes and is closed at one side thereof, said tubes allowing a flow of said mixture from outward inwardly.

The filter tubes may be parallel to each other and spaced from each other and are connected to each other at one end thereof with a common collecting space.

The filter may be positioned in said container, said container having a discharge opening for the liquid passed through said filter.

Said feeding opening and said discharge opening may be each provided with a check valve.

The device may further include insert plates positioned in said filter and provided with through passages which narrow in one direction.

The device may further comprise means for adjusting and controlling the amplitude and/or frequency of said oscillations, preferably comprising conventional devices for adjusting in a well-known vibro-mixer the intensity of an alternating current through a balanced set of coils surrounding a heavy soft iron core connected to the push rod of the filter element and/or conventional devices for modifying the frequency of said alternating current Suitable vibro-mixers with adjustable oscillation amplitude are marketed by Chemap AG, CH-8604 Volketswil, Switzerland.

With the device according to the invention a backing effect occurs due to the oscillations of the filter element which effect is influenced by the magnitudes of oscillation amplitude and frequency, this retaining effect affecting particles to be retained, due to pressure waves in the region of through openings of the filtering surface such that these particles being of the size smaller than that of the openings can not pass through the filter mesh. Furthermore, due to oscillations, cake deposits on the screen or filter surface are avoided and the resistance to filtration of the used filter surface is minimized. Due to efficient retention of small particles on the filter surface even large mesh openings can be selected in the filter to enable maximal passage of the liquid being filtered.

When the amplitude and/or frequency of oscillations are adjusted and controlled the device can be quickly and simply adjusted to a mixture being treated whereby, particularly during operation, it is possible to ensure an optimal procedure by a respective control of these parameters.

The important advantage of the invention is that by switching off the oscillation generator or by suitable changing of its oscillation parameter it is possible, without any other means, to neutralize the retaining effect for the particles or to reduce it to a desired extent.

Due to the use of the cylindrical filter positioned in the container the filter can be surrounded with the mixture being filtered at all sizes whereby the filtering surface is utilized in an optimal manner.

For a further enlargement of the filtering surface, a plurality of filter tubes are provided as mentioned above. Such an embodiment of the device of this invention enables a substantially higher output, and all the tubes can be subjected to axial vibrations by a common oscillating device.

With the embodiment in which inserts, for example transversal disc-shaped plates, are positioned in the cylindrical filter element, which plates have passages narrowing in the direction toward the outlet opening, a pumping effect is obtained, which assists the liquid freed from particles to flow quicker from the outlet side of the filter surface. If the container has the check valves in the inlet and outlet thereof a pumping effect is obtained by means of which the mixture to be filtered is sucked independently and the liquid separated therefrom is transported automatically.

Inasmuch as the device of the invention has no rotating parts and no guides or walls for rotating parts the device is easily sterilized and can be suitable particularly in the biotechnology.

The novel features which are considered as characteristic for invention are set forth in particular in the appended claims. The invention itself, however, both as to its construction and its method of operation, together with additional objects and advantages thereof, will be best understood from the following description of specific embodiments when read in connection with the accompanying drawing.

FIGS. 1-3 show in schematic sectional side views different embodiments of the device of this invention; and FIG.4 is a sectional plan view of the device of FIG. 3, taken along the line IV—IV.

DETAILED DESCRIPTION OF THE PREFERRED EMBODIMENTS

Figure 1:
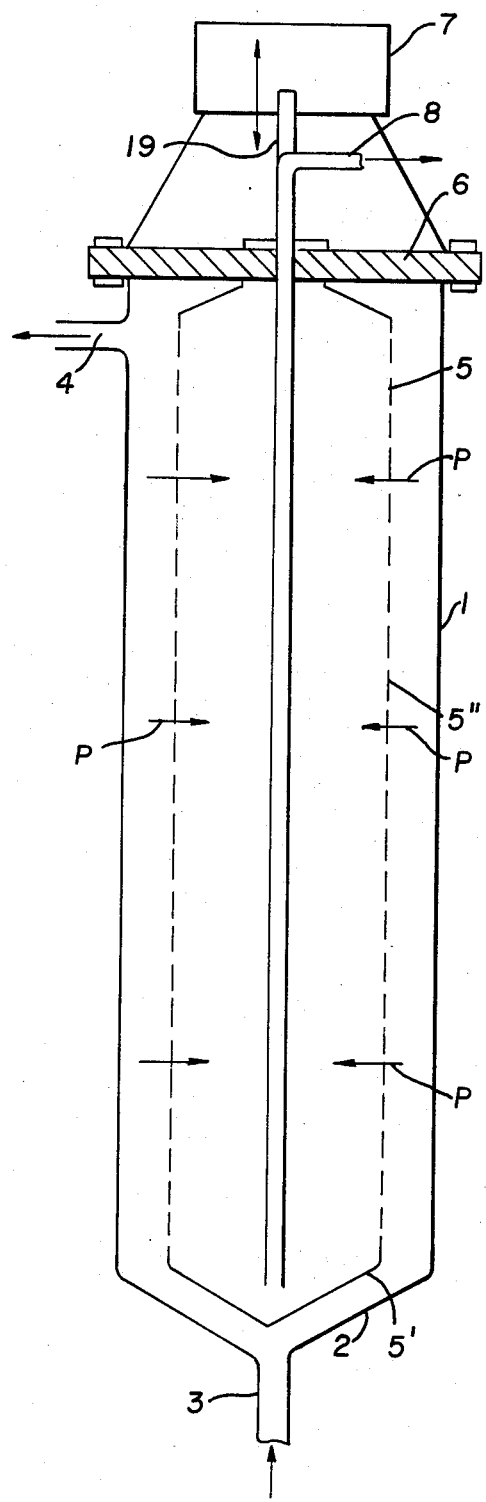

Referring now to the drawings in detail, it will be seen that in all illustrated embodiments, the device of the invention includes a substantially cylindrical container 1 which has at the lower end thereof a conically tapering portion 2 and, at the lowest part of the container, a feeding opening 3 for the mixture to be filtered. At the upper end of container 1, is provided a discharge opening 4 for a liquid phase containing retained particles. A substantially cylindrical screen or filter body or element 5 is positioned in the interior of the container 1. Filter element 5 has passage openings 5" which have a free passage width which is greater than the diameter of the particles to be retained. The filter element 5 is suspended on a lid or cover 6 made of flexible material and can oscillate by means of an oscillation generator 7. The oscillations imparted to the filter element 5 have amplitudes and frequencies which are adjustable and controllable by suitable conventional devices. A discharge conduit 8 for the liquid freed from dispersed particles is provided in the interior of the filter element 5 and passes through the cover 6. The lower part 5' of the screen or filter element 5 has a conical shape similar to that of the lower portion 2 of container 1 and is spaced from the wall of that lower portion as shown in FIGS. 1 to 3.

In all the exemplified embodiments, the external wall of container 1 and the wall of the filter element 5 are cylindrical; however, depending on individual requirements, the container 1 and filter element 5 can be of different shapes. A space between the internal wall of container 1 and the filter body or element 5 serves for the enrichment of dispersed particles. The phase which is freed from the particles being retained can flow through the passage openings into the interior of the screen or filter element 5 as shown by arrows P. The phase freed from the particles being retained is then, via the opening 8 of the discharge conduit, discharged from the interior of the filter element 5. The phase enriched with the particles being retained is conveyed from the container 1 through the outlet 4.

Figure 2:
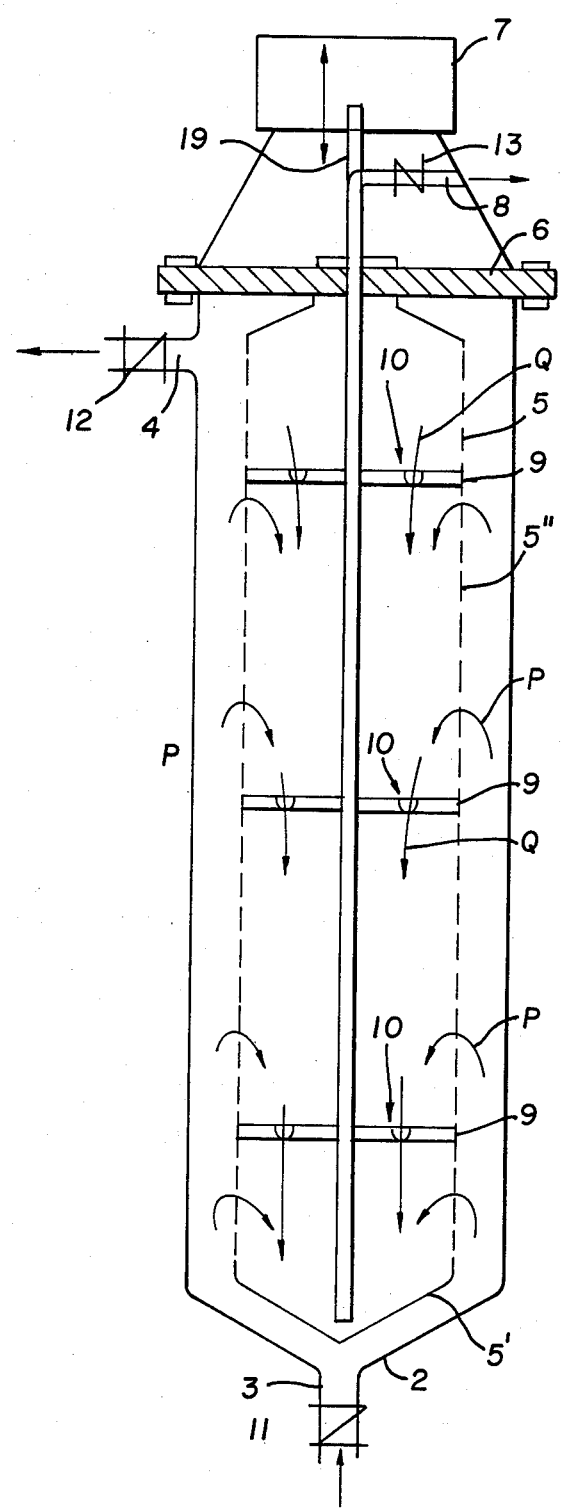

With reference to FIG. 2 it will be seen that the filter element has inserted in the interior thereof transversely extending inserts or disc-shaped plates 9 having through passages 10. In addition, the device of FIG. 2 is provided with check valves 11 to 13. Through passages 10 are narrowing in the downward direction. Due to the provision of inserts 9 inside the filter element 5 and due to the narrowing passages 10 a pumping action as indicated by arrows Q takes place in the filter element, which pumping action causes the transport of the carrier phase freed from particles toward the outlet 8 of the central discharge conduit. The arrangement of check valves 11 to 13 at the inlet or feeding opening 3 and discharge openings 4 and 8, respectively, ensures that a feedback pumping of the mixture fed into the inlet opening 3 or a feedback suction from discharge openings 4 and 8 be prevented.

In all the exemplified embodiments, the screen or filter element 5 is suspended on the prefabricated cover 6 of elastic material whereby no further support is required within container 1 for the filter element 5. Inasmuch as oscillatory movement transmitted via push rod 19 (as shown by double arrow) is within the limits of an elastic range of the material of cover 6, the discharge conduit 8 for the phase free from suspended particles can extend through the cover in a manner tightly fixed thereto without any gap therebetween. Thus, no sealing must be provided between a movable and a stationary part, which is particularly important for device which operate under sterile conditions.

Passage opening or mesh 5" of the screen or filter element 5 are largely exaggerated in the drawings. In practice, such openings in most cases have a diameter below 100 μm whereby with such structures and due to oscillations of the filter body, particles of smaller diameter than that of openings 5", suspended in the liquid or gaseous mixture can be easily retained from the same. The oscillation generator 7 is made such that the frequency and amplitude of oscillations can be changed whereby the liquid or gas-extraction effect of the entire device can be adjusted to structural conditions. A further advantage of the provision of the oscillating filter element resides in that, due to the movement of the filter element 5, the depositing of the particles to be retained on the filter element 5 is prevented whereby mesh or openings 5" remain always free to pass therethrough a carrier phase.

In the embodiment shown in FIGS. 3 and 4 a plurality of parallel thin screen or filter tubes 14 are provided, which are vertically extended at intervals from each other. Filter tubes 14 have mesh or passage openings 5". The tubes 14 are connected to each other by a common collecting space 15 which is in communication with the discharge opening of the conduit for the phase free from particles to be retained. The lower ends of the filter tubes 14 are inserted in respective openings 17 of a plate 16 whereas the upper ends of these tubes are closed by plugs 18. Such thin screen or filter tubes 14 can be hollow fibers which can be assembled in bundles to form larger units (multipe tube modules) and respectively provide greater filtering surfaces.

In operation, the mixture being treated is fed via inlet or feeding opening 3 into container 1, and the screen or filter element 5 is subjected by means of the oscillation generator 7 to such oscillations that their amplitude and frequency prevent penetration of the particles to be extracted from the mixture through the mesh or passage openings of the filter element 5.

It will be understood that each of the elements described above, or two or more together, may also find a useful application in other types of methods and devices for extracting liquid and/or gas from liquid or gaseous mixtures containing dispersed particles, differing from the types described above.

While the invention has been illustrated and described as embodied in a method and a device for extracting liquid and/or gas from a liquid or gaseous mixture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of separating fluids from a fluid mixture containing dispersed solid particles, comprising the steps of receiving and filtering said mixture in a filter body having an elongated filter surface provided with openings which exceed by 10 to 50% a desired size of particles to be retained; and in order to prevent the passage of particles said desired through said openings, oscillating said filter surface in its longitudinal direction at a frequency between 10 and 100 cycles per second and at an amplitude between 0.5 S and 50 S wherein S is the desired size of particles to be retained.

2. A method as defined in claim 1 wherein said filter surface has a substantially cylindrical configuration defining a center axis, and being subjected to oscillations the direction of said axis to pass fluid from said mixture through said openings.

3. A device for separating fluids from a fluid mixture containing dispersed fluid particles, comprising a container for receiving said mixture; at least one elongated filter surface located in said container and being permeable to particles of a predetermined minimal size; said filter surface being provided with openings exceeding by 10 to 50% desired size of particles to be retained; means for discharging a fluid passed through said filter surface; and an oscillation generator connected to said filter surface to impact thereto oscillations in longitudinal direction thereof at a frequency between 10 and 100 cycles per second and an amplitude between 0.5 S and 50 S where is said desired line of particles to be retained.

4. The device as defined in claim 3, wherein said filter surface is substantially cylindrical.

5. The device as defined in claim 3, wherein said filter surface includes a plurality of filter tubes each closed at one side thereof, said tubes allowing a flow of said mixture from outward inwardly.

6. The device as defined in claim 3, further including insert plates positioned in said filter surface and provided with through passages which narrow in one direction.

7. The device as defined in claim 3, further comprising means for adjusting and controlling an amplitude and frequency of said oscillations.

8. The device as defined in claim 5, wherein said tubes are parallel to each other and spaced from each other and are connected to each other at one end thereof with a common collecting space.

9. The device as defined in claim 3, wherein said container fluid. passed through said filter surface.

10. The device as defined in claim 9, wherein said container has in a lower region thereof a feeding opening for said mixture, and said discharge opening being positioned in an upper region of said container to discharge the fluid freed from said particles from said container.

11. The device as defined in claim 10, wherein said feeding opening and said discharge opening are each provided with a check valve.

* * * * *